United States Patent [19]
Ohtake et al.

[11] Patent Number: 5,954,897
[45] Date of Patent: Sep. 21, 1999

[54] DIE-CASTING ALUMINUM BASE ALLOY FOR A BEARING OF BALL JOINT APPARATUS, HEAT TREATMENT THEREOF AND BALL JOINT APPARATUS USING THE SAME

[75] Inventors: Minoru Ohtake; Yutaka Fujiwara, both of Aizuwakamatsu, Japan

[73] Assignee: Nisso Metalochemical Co., Ltd., Tokyo, Japan

[21] Appl. No.: 09/003,636

[22] Filed: Jan. 7, 1998

Related U.S. Application Data

[63] Continuation-in-part of application No. 08/628,700, filed as application No. PCT/JP95/01367, Jul. 10, 1995, abandoned.

[30] Foreign Application Priority Data

Aug. 18, 1994 [JP] Japan .................................. 6-216525
May 19, 1995 [JP] Japan .................................. 7-152186

[51] Int. Cl.$^6$ .................................................. C22C 21/10
[52] U.S. Cl. ........................ 148/701; 148/439; 420/532; 420/534; 420/538; 420/541
[58] Field of Search ................... 420/532, 534, 420/537, 538, 541, 546; 148/417, 439, 688, 701

[56] References Cited

U.S. PATENT DOCUMENTS 3,567,436  3/1971  Isobe et al. ........................ 420/516
3,720,510  3/1973  Isobe et al. ........................ 420/516
5,453,244  9/1995  Tanaka et al. ...................... 420/532

FOREIGN PATENT DOCUMENTS 1160195  12/1963  Germany .
27-255    1/1952   Japan .
48-25615  4/1973   Japan .
5-179384  7/1993   Japan .
379127    8/1964   Switzerland .

*Primary Examiner*—George Wyszomierski
*Attorney, Agent, or Firm*—Jacobson, Price, Holman & Stern, PLLC

[57] ABSTRACT

A die-casting aluminum base alloy consisting of, by weight %,

Zn:10~25%, Si:6~10%,
Cu:0.5~3.0%, Mn:0.1~0.5%,
Mg:0.02~0.08%, Fe:less than 1.3%, and the rest of Al and unavoidable impurity.

This alloy can be heat treated at low temperature from 260° C. to 450° C., at which steel parts inserted in this alloy will not deteriorate.

This alloy has excellent mechanical strength, stress corrosion cracking resistance and wear resistance, and can be used for ball joints apparatus such as a stabilizer conrod for automobile.

5 Claims, 1 Drawing Sheet

DIE-CASTING ALUMINUM BASE ALLOY FOR A BEARING OF BALL JOINT APPARATUS, HEAT TREATMENT THEREOF AND BALL JOINT APPARATUS USING THE SAME

This application is a continuation-in-part of application Ser. No. 08/628,700, filed Apr. 16, 1996, abandoned which is a 371 of PCT/JP95/01367 filed Jul. 10, 1995.

FIELD OF THE INVENTION

As a material to be used for members to which mechanical strength be required, iron containing bush and die-casting zinc base alloys, particularly die-casting zinc base alloy composed of Zn, Al and Cu, for example BERIC (trademark), have been mainly used. When these alloys are used as the material for the parts to which mechanical strength is required, the alloys can provide excellent mechanical properties, such as tensile strength, hardness and toughness, to the parts, however, those alloys have disadvantages such as inferior corrosion resistance and greater specific gravity as much as 6.8 g/cm$^3$.

In German patent No. 1160195, die-casting aluminum base alloy composed of Al, Zn, Si and Cu is shown, however, that alloy can not be used for parts of wheel assembly under carriage parts and chassis parts of automobile, which bear continuous or intermittent heavy load because stress corrosion cracking occurs in corrosive surroundings (KCl and NaCl for thaw and the sea side).

BACKGROUND ART

Whereas, when die-casting aluminum base alloy is used, the mechanical strength of the die-casted product tends to be uneven in a great extent since the tensile strength of the die-casting aluminum base alloy is low as much as 20 to 30 Kgf/mm$^2$, particularly 10 to 20 Kgf/mm$^2$ at 0.2% proof stress, and therefore, it is not possible to expect to obtain the die-casted product with high mechanical strength. Furthermore, the toughness of the die-casting aluminum base alloy is inferior, thus the industrial use of the die-casting aluminum base alloy has been limited.

On the other hand, traditional die-casting aluminum base alloy, for example, JIS-AC2B or AC4C is heat treated to improve mechanical strength at 500~540° C. However, steel parts deteriorates its mechanical strength of hardness when the aluminum base alloy has inserted steel parts. In other wards, traditional die-casting aluminum base alloy having inserted steel parts can not be heat treated.

Further more, traditional die-casting aluminum base alloy, sometimes, for example, typically JIS-ADC12, blisters when heated at more than 500° C. and then surface state of the alloy deteriorates.

DISCLOSURE OF THE INVENTION

It is an object of the present invention to provide a die-casting aluminum base alloy, which has such properties as tensile strength, hardness, toughness and wear resistance similar to those of die-casting zinc base alloy, for example BERIC, and has further a specific gravity and corrosion resistance equivalent to those furnished to die-casting aluminum base alloys being currently used and has excellent property of stress corrosion cracking resistance.

(1) Constitution of the Invention

The present invention is directed to a die-casting aluminum base alloy characterized that the die-casting aluminum base alloy contains zinc in an amount of from 10 to 25% by weight, silicon in an amount of from 6 to 10% by weight, copper in an amount of from 0.5 to 3.0% by weight, manganese in an amount of from 0.1 to 0.5% by weight, magnesium in an amount of from 0.02 to 0.08% by weight, iron in an amount of 1.3% or less by weight and aluminum and unavoidable impurity for the rest, and a die-casting aluminum base alloy to be used for a bearing or holder of ball joints.

(2) Detailed Explanation of the Invention

The inventors of the present invention found novel alloys having excellent tensile strength, wear resistance, toughness and stress corrosion cracking resistance, all of which could have not been given to die-casting aluminum base alloys in the past, by means of adding all of zinc, copper, magnesium, manganese and iron into an aluminum-silicon base alloy.

In particular, the aluminum base alloy according to the present invention has excellent properties to be used for ball joints and a stabilizer conrod for automobile. By using the aluminum base alloy of the present invention, the use of aluminum base alloys as the material for parts whereto the die-casting aluminum base alloy currently used could have not been applied, is now becoming possible.

Advantageous effect of metallic elements is expected as follows.

Zn:(10–25%)

Zinc makes a solid solution in proeutectic a (alpha phase) and is an element capable of effectively improving tensile strength, hardness, etc. of an alloy admixed therewith.

However, such effects of zinc are tend to decrease and hot tear crack may happen because range of solidification temperature becomes broader, when the content of zinc stays at less 10%. Wear resistance and corrosion resistance may deteriorate if the content of zinc exceeds 25%. When zinc coexists with silicon, there is a tendency to form eutectic crystals consisted of Al, Si and Zn, thereby resulting in lowering of the melting point, which further making the castability better and sliding bearing property, which makes hard to attack opposite material, becomes better. Further Zinc makes in this invention lower solid solution temperature to 260~450° C.

Si:(6–10%)

Silicon is an element capable of effectively improving the wear resistance and strength of a material admixed therewith, and it has also an effect of lowering a melting point of the material to thereby improve the castability of the material if it is admixed into the material. However, when the content of silicon in the material is less than 6%, fluidity and the wear resistance of the material deteriorate, while the toughness of the material deteriorates if the content of silica exceeds 10%. Preferable content of silica is from 6.5% through 8.5%.

Cu:(0.5–3.0%)

Copper is an element which dissolves in the form of solid into initial phase crystals of a material and can effectively improve the strength and hardness of the material. However, when the content of copper in the material is less than 0.5%, said improving effect becomes low, while the toughness and the corrosion resistance of the material deteriorates by cristalization of intermettalic compound if the content of copper in the material exceeds 3%. Preferable content of copper is from 0.5% through 1.5%.

Mn:(0.1–0.5%)

Manganese is an element which can reform needle-shaped intermetallic compound containing iron to granular shape to thereby improve the toughness of a material admixed therewith. However, when the content of manganese in the material is less than 0.1%, such effect cannot be furnished, while the toughness of the material admixed decreases if the content of manganese in the material exceeds 0.5%, and which decrease further causing the elevation of melting point and the deterioration of the castability of the material.

Mg:(0.02–0.08%)

Magnesium is an element of which trace amount can facilitate to dissolve a material admixed therewith in the form of solid during the initial phase of crystallization of a material and to form Mg2Si to thereby result in precipitation hardening of the material, and it is extraordinary effective for improving the strength of the material. However, when the content of magnesium in the material is less than 0.02%, said effect cannot be furnished. If the content of magnesium in the material exceeds 0.08%, the alloy results in embrittlement and deteriorates in castability, and especially stress corrosion cracking sensitivity becomes enhanced.

Fe:(1.3% or less)

Iron is an element which can effectively prevent the adhesion of a material to a foundry mold. However, when the content of iron in the material exceeds 3%, intermetallic compounds between any of Al, Si and Fe are produced, thereby deteriorating the toughness and corrosion resistance of the material.

It is confirmed that the alloys consisting of aluminum and unavoidable impurity and further containing the all elements described above each at a content in a ranges as described above, respectively, are excellent die-casting aluminum base alloys having high tensile strength, hardness and toughness with excellent property of stress corrosion cracking resistance, which have solved the disadvantages of currently used die-casting aluminum base alloy and die-casting zinc base alloy The die-casting aluminum base alloy of this invention is characterized from die-casting aluminum base alloy shown in German patent No.1160195 by magnesium content, namely reduced magnesium content in this invention improves property of stress corrosion cracking and toughness.

Further, the die-casting aluminum base alloy of present invention can be heat treated at 260~450° C. to improve mechanical strength of tensile strength and toughness. Heat treatment in present invention may be carried out at 260~450° C. by heating for 30minutes to 20 hours for solid solution treatment, cooling at a rate faster than 20° C. per second for quench hardening and leaving at room temperature for more than 24 hours for aging.

By the heat treatment, the die-casting aluminum base alloy of this invention can be improved its mechanical strength without deteriorating steel parts inserted in the die-casting aluminum base alloy without blister.

1: Shaft, 2: Ball, 3: Holder, 4: Cap, 5: Boots, 6: Glees.

Figure 1:
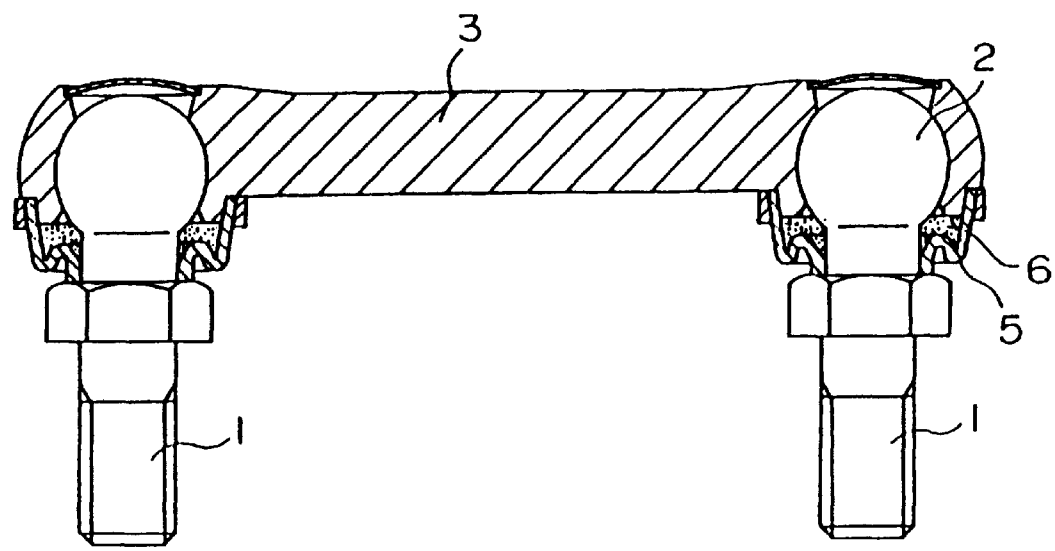
FIGS. 1 and 2 illustrate the examples where the alloy according to the present invention is used, and each numbers in the figures represent the following parts.

FIG. 1 is a sectional view of a stabilizer conrod for automobiles cut at a part thereof, wherein a pair of balls (2) respectively locating at the end of a shaft (1) are freely grasped by holders (3) casted with the alloy according to the present invention, respectively, and thus a ball joint is constituted.

Figure 2:
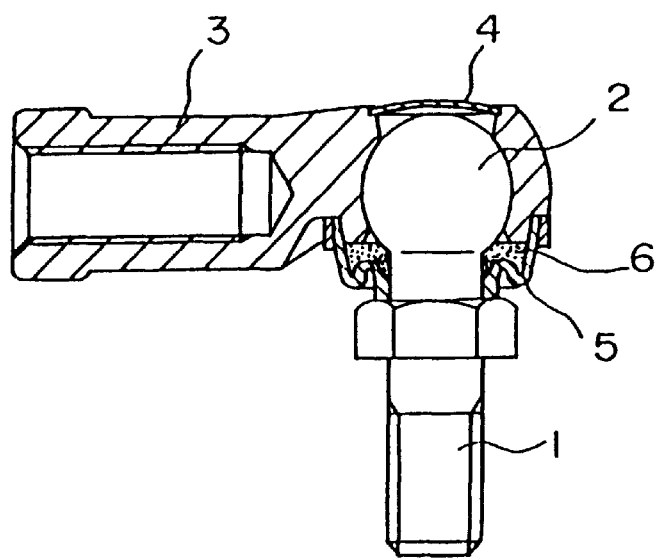

FIG. 2 is a sectional view of a ball joint cut at a part thereof, which is constituted in a typical ball joint. The ball joint has a structure wherein a holder (3) casted with the alloy according to the present invention is holding a ball (steel ball) (2).

BEST MODE FOR CARRYING OUT THE INVENTION

Now, the present invention is described in detail with referring to the following examples. However, it should be noted that the present invention should not be limited to the scope defined by the examples described below.

EXAMPLE 1

Casting and Test Pieces

Several aluminum base alloys each consisted of a chemical composition as shown in Table 1 were produced according to dissolution method being commonly-used, then die-casting of the alloy was carried out at a casting temperature of 750° C. by using cold chamber type die-casting machine having a performance of 135 tons compressive force for casting. For the metallic mold used for the die-casting, a mold for producing both tensile test piece (diameter of the parallel part: 6.35 mm, gauge length: 50 mm, length: 230 mm) conforming to ASTM standard (B8-66) and impact test piece (dimension: 6.35×6.35×230 mm) was employed. Mechanical tests were then carried out by using the test pieces described above. The hardness was also tested for the impact piece by polishing the piece with Emery papers (#1000) and then measured by using Vickers hardness test meter.

These mechanical test were carried out as follows.

Tensile strength, proof strength and elongation: JIS Z 2241(Method of tensile test for metallic materials)

Value of impact energy: JIS Z 2242 (Method of impact test for metallic materials)

Vickers hardness: JIS Z 2244 (Method of Vickers hardness test)

The alloys tested include the alloys No.1 through No.5 prepared according to the present invention, the comparative alloys No.6 through No.12, an alloy No.13 (die-casting alloy: ADC 12) being currently used, and a die-casting aluminum base alloy No.14 (alloy shown in German patent No.1160195). Each of the comparative alloys No.5 through No. 14 has a chemical composition any of which components be out of the range of the corresponding components specified for the alloys of the present invention, respectively.

A variety of mechanical properties obtained for each alloys are shown in Table 2. As can be seen from the results shown in the Table 2, it is obviously understood that the alloys of the present invention show to have better mechanical properties than either properties of the comparative alloys or the prior known.

EXAMPLE 2

Stress Corrosion Cracking Resistance

Alloy shown in Table 1 were casted as shown in example 1 and test pieces were obtained. Stress corrosion cracking test were carried out for the test pieces by static load tensile test.

The pieces were subjected to immersion test in aqueous solution of 5% NaCl containing 0.3% $H_2O_2$ at 35° C.±1° C. and pH 6.5 under static load. The aqueous solution was changed every day. Fracture life was measured under the static load of 20 kgf/mm2.

From the results, alloys of present invention have excellent stress corrosion cracking resistance of more than 20 hours. On the other hand, comparative alloys happened rupture and comparative alloy of No. 13 (ADC 12) fractured immediately after start of the test because of test load was over the proof stress.

EXAMPLE 3

Wear Resistance

Alloy shown in Table 1 were casted as shown in example 1 and round bars with a dimension of 5 mm(Φ)×10 mm (length) were cut out from the casted pieces.

Wear resistance were measured by Pin-On-Disk method under the following conditions, opposite material:Steel disk S45C
Perepheral velocity:0.556 m/s
Load:500 kgf
Friction Distance:100 km The results were shown in Table 4.

Alloys of present invention have excellent slider bearing wear resistance, do not attack opposite material and is not wore. On the other hand, comparative alloys is wore and attack opposite material very much, and commercial alloy of No. 13 (ADC 12) which has a reputation to have a good wear resistance showed opposite material attack by abrasion.

In Table 5, overall evaluation is shown obtaining from the results of Tables 1~4.
From the evaluation, comparative alloys were not satisfied by all required properties and alloys of present invention has all required properties such as toughness, stress corrosion cracking resistance and wear resistance.

EXAMPLE 4

Heat Treatment (Quench Hardening)

(1) Heat Treatment (Quench Hardening)

Tensile test pieces for Alloys shown in Table 1 as No. 3 (present invention) and No. 13 (comparative alloy) were prepared as shown in example 1.

Each test pieces was heated at a rate of 5° C./min. to 250° C., 260° C., 300° C., 400° C., 450° C. and 500° C., and kept for 3 hours at each temperature for solid solution treatment. Then the heated test pieces were cooled at a rate of 100° C./sec. for quench hardening and leave at room temperature (25° C.) for 72 hours.

(2) Mechanical testing

Tensile strength and elongation were measured as shown in example 1 for the test pieces after heat treatment and surfaces were observed, and the results were shown in Tables 6 and 7.

Alloys of present invention could be hardened from 260° C. to 450° C. and tensile strength reach to 43 kgf/mm$^2$ at 450° C. But the alloy could not be hardened at 250° C. or less, and at 500° C. or higher, and further blister of the surface was observed at 500° C.

TABLE 1

Chemical composition

| | No. of Alloy | Zn | Si | Cu | Mg | Mn | Fe | Al | Remark |
|---|---|---|---|---|---|---|---|---|---|
| Alloys | 1 | 20.0 | 7.5 | 1.0 | 0.05 | 0.3 | 0.5 | Rest | |
| of | 2 | 14.1 | 7.5 | 1.0 | 0.08 | 0.3 | 0.4 | Rest | |
| Present | 3 | 14.5 | 7.5 | 1.0 | 0.05 | 0.3 | 0.4 | Rest | |
| Inven- | 4 | 15.0 | 6.5 | 1.0 | 0.02 | 0.3 | 0.4 | Rest | |
| tion | 5 | 18.0 | 6.2 | 1.0 | 0.05 | 0.3 | 0.4 | Rest | |
| Compara- | 6 | 12.0 | 9.0 | 2.0 | 0.3 | 0.3 | 0.5 | Rest | |
| tive | 7 | 5.0 | 8.0 | 1.0 | 0.3 | 0.3 | 0.5 | Rest | |
| Alloys | 8 | 28.0 | 8.0 | 1.0 | 0.3 | 0.3 | 0.5 | Rest | |
| | 9 | 15.0 | 2.0 | 1.0 | 0.3 | 0.3 | 0.5 | Rest | |
| | 10 | 15.0 | 12.5 | 1.0 | 0.3 | 0.3 | 0.5 | Rest | |
| | 11 | 15.0 | 8.0 | 1.0 | 1.5 | 0.3 | 0.5 | Rest | |
| | 12 | 20.0 | 7.0 | 1.0 | 0.008 | 0.3 | 0.5 | Rest | |
| | 13 | 0.3 | 11.5 | 2.0 | 0.1 | 0.2 | 0.8 | Rest | ADC 12* |
| | 14 | 15.0 | 8.5 | 0.5 | 0.3 | 0.3 | 0.4 | Rest | German P** |

*ADC. 12; commercialized alloy.
**Alloy shown in German patent No. 1160195.

TABLE 2

Mechanical Properties

| | No. of Alloy | Tensile Strength Kgf/mm$^2$ | Proof Stress Kgf/mm$^2$ | Elon- gation % | Value of Impact Energy Kg · m/cm$^2$ | Hard- ness Hv | Strength x Elonga- tion | Tough- ness* |
|---|---|---|---|---|---|---|---|---|
| Alloys | 1 | 37 | 26 | 4.0 | 2.3 | 147 | 148 | ⊚ |
| of | 2 | 37 | 26 | 4.8 | 2.5 | 144 | 178 | ⊚ |

TABLE 2-continued

Mechanical Properties

| | No. of Alloy | Tensile Strength Kgf/mm² | Proof Stress Kgf/mm² | Elongation % | Value of Impact Energy Kg·m/cm² | Hardness Hv | Strength × Elongation | Toughness* |
|---|---|---|---|---|---|---|---|---|
| Present Invention | 3 | 36 | 24 | 5.2 | 2.7 | 141 | 187 | ⊚ |
| | 4 | 35 | 25 | 2.9 | 1.9 | 145 | 102 | ⊚ |
| | 5 | 36 | 25 | 3.1 | 2.0 | 146 | 112 | ⊚ |
| Comparative Alloys | 6 | 22 | 17 | 2.3 | 2.2 | 114 | 51 | ○ |
| | 7 | 28 | 21 | 0.7 | 0.6 | 131 | 20 | x |
| | 8 | 21 | 14 | 2.8 | 1.9 | 117 | 39 | x |
| | 9 | 27 | 16 | 0.5 | 0.5 | 133 | 14 | x |
| | 10 | 26 | 18 | 2.5 | 2.3 | 130 | 65 | ○ |
| | 11 | 31 | 27 | 0.9 | 0.6 | 145 | 28 | x |
| | 12 | 24 | 15 | 2.4 | 1.9 | 126 | 58 | ○ |
| | 13 | 24 | 16 | 1.8 | 1.5 | 115 | 43 | x |
| | 14 | 38 | 25 | 1.1 | 0.8 | 148 | 42 | x |

*evaluation of toughness was determined by value of strength × Elongation.
⊚: over 100
○: from 50 through 100,
x: less than 50

TABLE 3

Stress Corrosion Cracking Resistance

| | No. of Alloy | Fracture Life (hours) | Evaluation* |
|---|---|---|---|
| Alloys of Present Invention | 1 | over 20 | ○ |
| | 2 | over 20 | ○ |
| | 3 | over 20 | ○ |
| | 4 | over 20 | ○ |
| | 5 | over 20 | ○ |
| Comparative Alloys | 6 | 2 | X |
| | 7 | 5 | X |
| | 8 | 3 | X |
| | 9 | 4 | X |
| | 10 | 3 | X |
| | 11 | 1 | X |
| | 12 | over 20 | ○ |
| | 13 | Unable to measure | X |
| | 14 | 3 | X |

*: ○: over 20 hours, X: less than 20 hours

TABLE 4

Wear Resistance

| | No. of Alloy | Friction Amount (mm³) Pin | Friction Amount (mm³) Disk | Total Amount (mm³) | Evaluation* |
|---|---|---|---|---|---|
| Alloys of Present Invention | 1 | 10.1 | 2.5 | 12.6 | ⊚ |
| | 2 | 12.0 | 3.5 | 15.5 | ⊚ |
| | 3 | 12.1 | 2.6 | 14.7 | ⊚ |
| | 4 | 10.3 | 2.8 | 13.1 | ⊚ |
| | 5 | 11.1 | 2.5 | 13.6 | ⊚ |
| Comparative Alloys | 6 | 55.4 | 74.0 | 129.4 | X |
| | 7 | 68.2 | 21.4 | 89.6 | X |
| | 8 | 22.3 | 5.4 | 27.7 | ○ |
| | 9 | 12.7 | 2.3 | 15.0 | ⊚ |
| | 10 | 70.5 | 36.0 | 106.5 | X |
| | 11 | 18.3 | 25.6 | 43.9 | ○ |
| | 12 | 30.5 | 11.9 | 42.4 | ○ |
| | 13 | 11.4 | 226.8 | 238.2 | X |
| | 14 | 13.2 | 4.2 | 17.4 | ⊚ |

*Evaluation of Wear Resistance was determined by the value of Total Amount.
⊚: less than 20, ○: from 20 through 50, X: over 50

TABLE 5

Total Evaluation

| | No. of Alloy | Toughness | Stress Corrosion Crack Resistance | Wear Resistance | Total Evaluation |
|---|---|---|---|---|---|
| Alloys of Present Invention | 1 | ⊚ | ○ | ⊚ | Excellent |
| | 2 | ⊚ | ○ | ⊚ | Excellent |
| | 3 | ⊚ | ○ | ⊚ | Excellent |
| | 4 | ⊚ | ○ | ⊚ | Excellent |
| | 5 | ⊚ | ○ | ⊚ | Excellent |
| Comparative Alloys | 6 | ○ | X | X | Poor |
| | 7 | X | X | X | Poor |
| | 8 | X | X | ○ | Poor |
| | 9 | X | X | ⊚ | Poor |
| | 10 | ○ | X | X | Poor |
| | 11 | X | X | ○ | Poor |
| | 12 | ○ | ○ | ○ | Poor |
| | 13 | ⊚ | X | X | Poor |
| | 14 | X | X | ⊚ | Poor |

TABLE 6

Heat Treatment (Quench Hardening)

| Heat Temp. (note 1) °C. | Tensile strength (Kgf/mm$^2$) | | Blister observed or not |
|---|---|---|---|
| | Alloy No. 3 (present invention) | Alloy No. 13 (Comparetive) | |
| 250 | 30 | 11 | not |
| 260 | 37 | 15 | not |
| 300 | 40 | 15 | not |
| 400 | 42 | 15 | not |
| 450 | 43 | 15 | not |
| 500 | 24 | 10 | observed | note 1: solid solution treatment temperature

TABLE 7

Heat Treatment (Quench Hardening)

| Heat Temp. (note 1) °C. | Elongation (%) | |
|---|---|---|
| | Alloy No. 3 (present invention) | Alloy No. 13 (Comparetive) |
| 250 | 3 | 2 |
| 260 | 6 | 4 |
| 300 | 6 | 4 |
| 400 | 7 | 4 |
| 450 | 7 | 5 |
| 500 | 2 | 2 |

Industrial Utilization

The alloy of the present invention provides with a specific gravity which is equivalent to those owned by die-casting aluminum base alloys being currently used, and it can be produced in a low cost and has excellent mechanical properties, stress corrosion cracking resistance and slider bearing wear resistance. Therefore, the alloy of the present invention can be used as a die-casting aluminum base alloy with suitable properties required for the material for sliding bearing parts, bearing parts, etc., particularly for ball joints. Especially the alloy of the present invention can be used for chassis parts of automobile such as stabilizer conrod and joint, which has inserted steel parts.

What is claimed is:

1. An aluminum base alloy consisting of, by weight,
   Zn:10~25%, Si:6~10%,
   Cu:0.5~3.0%, Mn:0.1~0.5%,
   Mg:0.02~0.08%, Fe:less than 1.3%,
   and the rest of Al and unavoidable impurity.

2. A die-casting aluminum base alloy having excellent mechanical strength consisting of, by weight,
   Zn:10~25%, Si:6~10%,
   Cu:0.5~3.0%, Mn:0.1~0.5%,
   Mg:0.02~0.08%, Fe:less than 1.3%, and the rest of Al and unavoidable impurity.

3. A ball joint apparatus made of a die-casting aluminum base alloy consisting of, by weight,
   Zn:10~25%, Si:6~10%,
   Cu:0.5~3.0%, Mn:0.1~0.5%,
   Mg:0.02~0.08%, Fe:less than 1.3%,
   and the rest of Al and unavoidable impurity.

4. A method for heat treatment of a die-casting aluminum base alloy consisting of, by weight,
   Zn:10~25%, Si:6~10%,
   Cu:0.5~3.0%, Mn:0.1~0.5%,
   Mg:0.02~0.08%, Fe:less than 1.3%,
   and the rest of Al and unavoidable impurity, which comprises heating said alloy to a temperature of from 260° C. to 450° C.

5. A method according to claim 4, further comprising, after said heating, cooling said alloy to a room temperature at a rate faster than 20° C. per second.

* * * * *